United States Patent
Innings et al.

[11] Patent Number: 5,992,347
[45] Date of Patent: Nov. 30, 1999

[54] METHOD OF MILKING AND A MILKING MACHINE

[75] Inventors: Lars Innings, Huddinge; Ole Lind, Tumba; Benny Ornerfors, Jarfalla; Gunter Schlaiss, Tumba, all of Sweden

[73] Assignee: Alfa Laval Agri AB, Tumba, Sweden

[21] Appl. No.: 08/952,226

[22] PCT Filed: May 14, 1996

[86] PCT No.: PCT/SE96/00628

§ 371 Date: Jan. 22, 1998

§ 102(e) Date: Jan. 22, 1998

[87] PCT Pub. No.: WO96/36211

PCT Pub. Date: Nov. 21, 1996

[30] Foreign Application Priority Data

May 17, 1995 [SE] Sweden .................................. 9501834

[51] Int. Cl.⁶ .................................................. A01J 5/16
[52] U.S. Cl. ................................ 119/14.07; 119/14.41; 119/14.44; 119/14.47
[58] Field of Search .......................... 119/14.02, 14.07, 119/14.41, 14.31, 14.47, 14.59, 14.25, 14.44

[56] References Cited

U.S. PATENT DOCUMENTS

| | | | |
|---|---|---|---|
| 3,255,732 | 6/1966 | Raht | 119/14.52 |
| 3,482,547 | 12/1969 | Maier | 119/14.36 |
| 4,211,184 | 7/1980 | Abrahamson | 119/14.02 |
| 4,572,104 | 2/1986 | Rubino | 119/14.02 |
| 5,218,924 | 6/1993 | Thompson et al. | 119/14.02 |
| 5,443,035 | 8/1995 | Lind et al. | 119/14.02 |

FOREIGN PATENT DOCUMENTS

| | | |
|---|---|---|
| 6024 | 12/1979 | European Pat. Off. |
| 32752 | 7/1981 | European Pat. Off. |
| 584890 | 2/1990 | European Pat. Off. |
| 382547 | 9/1976 | Sweden . |
| 460634 | 11/1989 | Sweden . |
| 2078077 | 1/1982 | United Kingdom . |
| WO9212625 | 8/1992 | WIPO . |
| WO9314625 | 8/1993 | WIPO . |

*Primary Examiner*—Peter M. Poon
*Assistant Examiner*—Yvonne Abbott
*Attorney, Agent, or Firm*—Hovey, Williams, Timmons & Collins

[57] ABSTRACT

A milking machine having a teatcup (3) with a teatcup liner (6) and a pulsation chamber (7), the pulsating vacuum level is determined when the teatcup liner (6) abruptly opens or closes. At least one of the milking vacuum and the pulsating vacuum is controlled such that the maximum level of the pulsating vacuum is lower than the milking vacuum level and at least as high as the determined level.

25 Claims, 2 Drawing Sheets

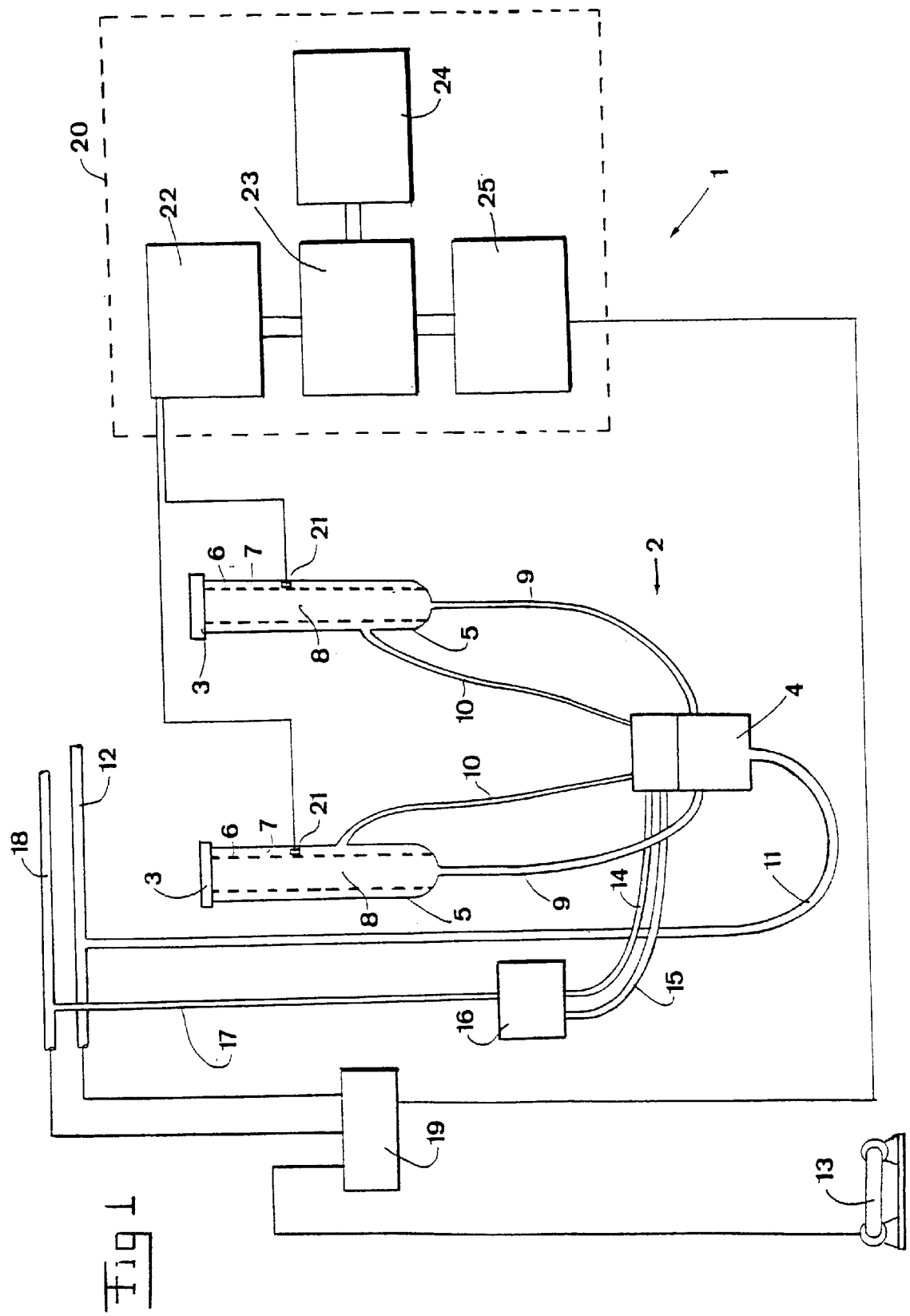

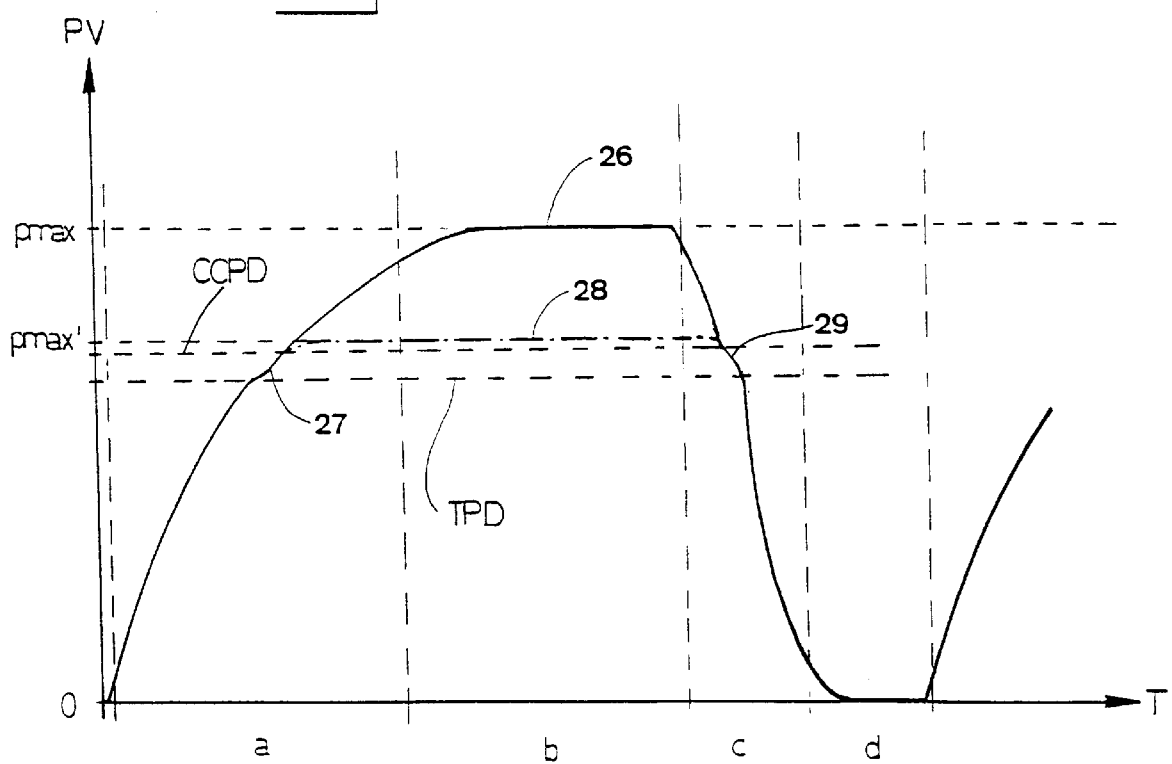

METHOD OF MILKING AND A MILKING MACHINE

BACKGROUND OF THE INVENTION

1. Field of the Invention

The present invention relates to a method of milking an animal by a milking machine having a teatcup with a teatcup liner and a pulsation chamber, comprising applying the teatcup to the teat of the animal, and applying a milking vacuum to the interior of the teatcup liner and a pulsating vacuum to the pulsation chamber so that the teatcup liner cyclically opens and closes. Moreover the invention relates to a milking machine comprising a teatcup having a teatcup liner and a pulsation chamber, a vacuum source for generating a milking vacuum in the interior of the teatcup liner and a pulsator provided to alternately connect the pulsation chamber to the atmosphere and to said vacuum source for generating a pulsating vacuum in the pulsation chamber so that the teatcup liner cyclically opens and closes.

2. Description of the Prior Art

Traditionally a milking machine comprises a cluster having a claw and four teatcups, each teatcup having a shell and a teatcup liner provided in the shell to form a pulsation chamber between the teatcup liner and the shell. During milking the interior of the teatcup liner is subjected to a milking vacuum, i.e. a low pressure of normally about 50 kPa under atmospheric pressure. There are also milking machines working under high pressure conditions, whereby the low pressure might be above atmospheric pressure. The pulsation chamber is subjected to a cyclically pulsating vacuum normally varying between atmospheric pressure, when the teatcup liner is collapsed or closed, and a maximum vacuum level when the teatcup liner is fully open. The maximum pulsating vacuum level is normally a low pressure level of 50 kPa under atmospheric pressure, i.e. equal to the milking vacuum level. This means that the pressure difference across the wall of the teatcup liner is essentially equal to zero when the teatcup liner is fully open.

The pulsating vacuum demonstrates a pulsation cycle which may be divided into four phases, i.e. (a) an opening phase during which the pulsating vacuum increases from atmospheric pressure to normally about the milking vacuum level and the teatcup liner moves from a closed position to an open position, (b) an open phase during which the pulsating vacuum has reached its maximum level and is essentially equal to the milking vacuum level and the teatcup liner is in an open position, (c) a closing phase during which the pulsating vacuum decreases from about the milking vacuum level to the atmospheric pressure and the teatcup liner moves from the open position state to the closed position, and finally (d) a closed phase during which the pulsating vacuum is equal to the atmospheric pressure and the teatcup liner is in a closed position. The opening and closing of the teatcup liner during phase (a) and (c), respectively comprises a very fast and abrupt movement of the teatcup liner. From a closed state, i.e. opposite wall portions of the teatcup liner touch each other, as the pulsating vacuum increases the teatcup liner remains essentially closed until it at a certain pulsating vacuum level, the so called TPD (touch pressure difference), starts to open abruptly to the so called CCPD (critical collapse pressure difference) at which level the teatcup liner is fully open, i.e. said opposite wall portions of the teatcup liner are spaced apart from each other. From the point of time when the pulsating vacuum exceeds the CCPD-level the teatcup liner thus is essentially open and a further increase of the pulsating vacuum only results in an insignificant further opening of the teatcup liner.

Each milking may be divided into four periods, i.e. (I) the initial stimulation or massage period, (II) the main flow period, (III) the flow decreasing period, and (IV) the flow terminating period. During the initial, flow decreasing and flow terminating period the milk flow is reduced in comparison with the main flow period.

Among those skilled in the art it has up to now been considered necessary that the teatcup liners must be fully open once every pulsation cycle at least during the main flow period in order not to restrict the milk flow, and hence that the maximum pulsating vacuum level should be equal to or even higher than the milking vacuum level.

However the opening movement of the teatcup liner leads to a fast increase of the volume in the interior of the teatcup liner. During the initial, the flow decreasing and the flow terminating periods of each milking, i.e. when the milk flow is small, this volume increase in the interior of the teatcup liner will result in a momentary increase of the vacuum in the interior of the teatcup liner. Such a momentary vacuum increase may subject the exposed teat surface to a strong vacuum, resulting in stretching of the teat surface, and may lead to a back flow of the milk or of milk droplets which are jetted with a very high velocity towards and against the teat tip. This is a rather ungentle treatment which may hurt the animal, lead to injuries on the teats, and furthermore the backflow of milk increases the risk of transmitting diseases, e.g. mastitis. It may happen that bacteria associated with one teat passes directly into the interior of another teat, increasing the risk of infection.

Such a vacuum increase during in particular the terminating period may also result in that the teatcup is crawling upwards on the teat. Such upward movements of the teatcup at the end of the milking as the teat becomes slack leads to a throttling of the milk conducting interior of the teat and consequently the milk flow may be stopped although a considerable amount of rest milk remains in the udder.

Many proposals have been made in the past in order to remedy some or all of the problems discussed above.

WO-A-9 212 625 discloses a method of operating a milking machine such that the pulsating vacuum increase and decrease are changed at a slower rate during the massage period, the flow decreasing period and the flow terminating period. During the main flow period the pulsating vacuum changes at a normal rate. By means of this way of operating the milking machine, the teatcup liner moves more slowly when the milk flow is reduced, which results in less crawling and a more gentle treatment of the teats.

U.S. Pat. No. 4,211,184 discloses a method and an apparatus for milking with the aim to minimise vacuum damages to the teats of the animal. This document proposes to monitor the vacuum level in a ring chamber of the mouth piece of the teatcup and to control the pulsating vacuum in response thereto. The disclosed method and apparatus is described to operate such that the full milking vacuum level will be experienced in the ring chamber in the initial period to control the maximum pulsating vacuum to be at a low level, thus closing the teatcup liner, preventing the teatcup liner from crawling and preventing strong milking vacuum from damaging the teat. At full milk flow the teat will be pressurized by the presence of milk in the teat resulting in a reduced vacuum level in the ring chamber and thus an increase in the maximum pulsating vacuum level. At the flow terminating period the vacuum level in the ring chamber will again increase, which once again reduces the maximum pulsating vacuum level.

EP-A-584 890 and SE-B-382 547 both relate to the control of the pulsating vacuum in response to the milk flow which is detected by a milk flow sensor. EP-A-584 890 proposes to adjust the pulsator ratio in response to the milk flow such that the closed phase (d) is extended when the milk flow is reduced. SE-B-382 547 proposes to reduce the maximum pulsating vacuum level when the milk flow is less than a certain value.

WO-A-9 314 625 discloses a milking apparatus including, for each claw, a pulsator and a control unit responsive to the opening and closing of the teatcup liners. The pulsation switching characteristics of the pulsator are controlled by the control unit in sympathy with the opening and the closing of the teatcup liners in order to improve the pulsation effectiveness, i.e to ensure the fully collapsing and opening of the teatcup liners in a single pulsation cycle. Thus this piece of prior art provides a method in which the pulsator is not switched from the atmospheric pressure to a low pressure or vice versa until the liner is fully closed or opened, respectively. When the liners are fully closed or opened, the air flow in the pulsating vacuum pipe ceases. This cessation of air flow is detected by different means proposed in WO-A-9314625. E.g. such means comprises a piston and cylinder device provided in the pulsating vacuum pipe, whereby the piston moves with the air flow and comes to rest at two opposite positions at which positions the piston is detected to give a signal to the pulsator to change between atmospheric pressure and low pressure. Other proposed means are a device comprising a rubber diaphragm moving in response to the air flow, a rotating turbine device, and a hot wire galvanometer.

SUMMARY OF THE INVENTION

The object of the present invention is to overcome the disadvantages mentioned above and to provide an improved way of controlling the milking process. More specifically the present invention aims to achieve a more gentle treatment of the teats and a reduced amount of rest milk in the udder.

This object is obtained by the method initially defined which is characterized by the steps of:
determining the pulsating vacuum level when the teatcup liner abruptly opens or closes, and
controlling at least one of the pulsating and milking vacuums such that the maximum level of the pulsating vacuum is lower than the milking vacuum level and at least as high as said determined level.

Contrary to the general opinion among those skilled in the art it has now been recognised that the maximum pulsating vacuum level also during the main flow period may be lower than the milking vacuum level without negatively influencing the milk flow. Even if the teatcup liner would not be fully opened, the milk flow during the main flow period will not be reduced and the milking time will not be prolonged, provided that the teatcup liner only passes said very abrupt movement from the closed to the opened state during each pulsation cycle.

By reducing the maximum pulsating vacuum level a better and less ungentle treatment of the teats is obtained and the risk of crawling of the teatcups is reduced, resulting in less rest milk. A reduced amount of rest milk improves the udder health and reduces the risks of infection.

According to one embodiment at least one of the pulsating and milking vacuums, preferably the pulsating vacuum, is controlled such that the maximum level of the pulsating vacuum is significantly lower than the milking vacuum level. The maximum level of the pulsating vacuum may exceed said determined level by 0–60%, preferably 1–40% of the difference between the milking vacuum level and said determined level.

By recognising the very abrupt opening or closing of the teatcup liner the maximum pulsating vacuum level may be controlled such that the teatcup liner just opens, i.e. the maximum pulsating vacuum may be on an optimal level which is just above the one necessary for the opening of the teatcup liner and which is low enough not to give rise to the disadvantages discussed above. Thus by the proposed method smoother movements of the teatcup liner are obtained, which when the milk flow is low result in a more gentle treatment of the teats. Furthermore, since the opening of the teatcup liner is somewhat limited a frictional contact between the teat and the teatcup liner is maintained also when the teat becomes slack during the flow decreasing and terminating periods so that the crawling of the teatcup will diminish and hence less rest milk will remain in the udder.

According to another embodiment said determining step is performed by sensing a variable responsive to the opening or closing of the teatcup liner, and by detecting the pulsating vacuum level when said sensed variable indicates said abrupt opening or closing of the teatcup liner. This variable is according to a further embodiment, the increase rate or the decrease rate of the pulsating vacuum, whereby said rate is sensed and the pulsating vacuum level may be detected in a convenient manner when said sensed increase rate or decrease rate is temporarily reduced.

Furthermore alternative embodiments are proposed for determining the pulsating vacuum level when the teatcup liner abruptly opens or closes. Firstly the pulsating vacuum may be recorded as a function of time as the pulsating vacuum increases or decreases during a pulsation cycle, the derivative thereof may be sensed and thus the pulsating vacuum level may be determined by detecting it when the derivative is abruptly changed. Secondly the pulsating vacuum may be recorded over time as the pulsating vacuum increases or decreases during a pulsation cycle during which the interior of the teatcup liner is exposed to the atmospheric pressure, a pulsating vacuum/time function based on the recorded pulsating vacuum may be determined, and during a subsequent pulsation cycle during which the interior of the teatcup liner is exposed to said milking vacuum the pulsating vacuum level may be detected when the increase or decrease of the pulsating vacuum deviates a predetermined value from said determined pulsating vacuum/time function. Thirdly the pulsating vacuum may be recorded over time as the pulsating vacuum increases or decreases during a pulsation cycle, a theoretical pulsating vacuum/time function based on the recorded pulsating vacuum and on the prerequisite that the volume of the pulsation chamber is constant may be determined, the pulsating vacuum may be sensed during a subsequent pulsation cycle and the pulsating vacuum level may be detected when the sensed pulsating vacuum deviates a predetermined value from said theoretical pulsating vacuum time function. Fourthly the pulsating vacuum may be recorded during the increase or decrease of the pulsating vacuum over time, an extrapolated mathematical function may be determined by means of a few initial values of said recorded pulsating vacuum, the pulsating vacuum may be sensed, and the pulsating vacuum level may be detected when the sensed pulsating vacuum deviates a predetermined value from said determined extrapolated function.

The object of the present invention is also obtained by the milking machine initially defined which is characterized by
a sensing means for sensing the pulsating vacuum in the pulsation chamber, and an electronic processing unit adapted to control at least one of the pulsating and milking vacuums in response to said sensing means sensing the pulsating vacuum level when the teatcup liner abruptly opens or closes, such that the maximum level of the pulsating vacuum is lower than the milking vacuum level and at least as high as said sensed level.

Embodiments of the milking machine are defined in the dependent claims 18–25.

BRIEF DESCRIPTION OF THE DRAWINGS

The present invention will now be described in more detail with reference to the accompanying drawings, in which FIG. 1 shows a schematical view of a milking machine according to the invention, and FIG. 2 is a diagram of the pulsating vacuum during a pulsation cycle illustrating the operation of the milking machine of FIG. 1.

DESCRIPTION OF VARIOUS EMBODIMENTS OF THE PRESENT INVENTION

FIG. 1 shows a milking machine 1 which comprises a cluster 2 including at least one teatcup 3, and a claw 4. In the disclosed embodiment two teatcups 3 are provided, although it may be more teatcups, e.g. four, depending on the animal to be milked. Each teatcup 3 comprises a shell 5 and a teatcup liner 6. A pulsation chamber 7 is formed between the shell 5 and the teatcup liner 6. The interior of each teatcup liner 6 forms a milk conduc ting passage 8. The claw 4 is connected to the milk conducting passages 8 by short milk tubes 9, and to the pulsation chambers 7 by short pulse tubes 10. The short milk tubes 9 are via the claw 4 connected to a long milk tube 11 extending from the claw 4 to a milk line 12 which communicates with a vacuum pump 13. The short pulse tubes 10 are via the claw 4 connected in pairs to long pulse tubes 14, 15 which in turn are connected to a pulsator 16. The pulsator 16 is connected by one long pulse tube 17 to a pulsator airline 18 which communicates with the vacuum pump 13. Alternatively the long pulse tube 17 may be omitted and the pulsator 16 may be provided on the pulsator air line 18. A pressure regulating device 19 is provided between the vacuum pump 13 and the pulsator airline 18 and the milkline 12 in order to separately regulate the vacuum level to the pulsator airline 18 and to the milkline 12. The pressure regulating device 19 is electrically connected to an electronic processing unit 20 for controlling the pressure regulating device 19. A pressure sensor 21 is provided for sensing the pulsating vacuum in at least one of the pulsation chambers 7. The pressure sensor 21 is connected to the electronic processing unit 20. It should be noted that the pressure sensor 21 may be provided in one or more of the pulsation chambers 7 or in one of the short pulse tube 10, the long pulse tube 14, 15, the pulsator 16, and the claw 4.

The electronic processing unit 20 comprises different means which are illustrated as different functional blocks. It should be noted however that these functions may be performed by means of one or more microprocessors. The functional blocks are a recording means 22, connected to the sensor 21 for recording sensed values of the pulsating vacuum, a processing means 23, connected to the recording means 22 for processing the recorded values, a detecting means 24 communicating with the processing means 23 to detect deviations, and a control means 25, to control the pressure regulating device 19 in response to the sensed pulsating vacuum level.

FIG. 2 shows the pulsating vacuum PV in the pulsation chamber 7 as a function of time T during one pulsation cycle, whereby the continuous curve 26 represents the pulsating vacuum according to the prior art. The pulsating vacuum increases from zero (which corresponds to atmospheric pressure) during a phase (a) to a maximum pulsating vacuum level pmax of about 50 kPa, which corresponds to the milking vacuum level. During a phase (b) the pulsating vacuum remains at the maximum level pmax and during a phase (c) it drops back to zero and remains at zero during phase (d). During the phase (a) the teatcup liner 6 is closed until the pulsating vacuum has reached the touch pressure difference, TPD, at which pulsating vacuum level the teatcup liner 6 suddenly and abruptly opens. Due to this opening movement of the teatcup liner 6 the volume of the pulsation chamber 7 decreases. This volume decrease results in a temporary interruption of the increase of the pulsating vacuum in the pulsation chamber 7, which gives rise to a distinct irregularity at a portion 27 of the curve 26 during phase (a), see the diagram of FIG. 2. By means of the pressure sensor 21 and the electronic processing unit 20 it is possible to detect the pulsating vacuum level at the portion 27, which level corresponds to the touch pressure difference, TPD. The detected pulsating vacuum level is used to control the pulsating vacuum such that the maximum pulsating vacuum level pmax' follows the dash-dot curve 28 in the diagram of FIG. 2 and thus is significantly lower than according to the prior art and just above the TPD.

The TPD-level and CCPD-level, resp., is dependent on the individual teatcup liner 6. For example after use the teatcup liner 6 softens and the TPD-level and CCPD-level, resp., rises, i.e. the necessary pressure difference across the teatcup liner wall for causing closing and opening, respectively decreases. Typically this pressure difference is about 10 to 12 kPa. This means that with a milking vacuum level of 50 kPa, TPD will be about 38 to 40 kPa and pmax' will for example be in the range from 38 to 45 kPa, i.e. exceed TPD by about 0–60% of the difference between the milking vacuum level and TPD.

It should be pointed out that the abrupt movement of the teatcup liner also may be detected during phase (c) when the pulsating vacuum decreases and the teatcup liner 6 closes at the critical collapse pressure difference, CCPD. During phase (c) there is a sudden volume increase of the pulsation chamber 7 which is indicated as a distinct irregularity at a portion 29 of the curve 26 in the diagram of FIG. 2. Although it appears from FIG. 2 that the CCPD-level is the same during phase (a) and (c) and that the TPD-level is the same during phase (a) and (c), it should be noted that this must not be the case.

The TPD-level or CCPD-level may be determined in various ways. One possibility is offered by sensing a variable responsive to the opening or closing of the teatcup liner and by detecting the pulsating vacuum level when the sensed variable indicates said abrupt opening or closing of the teatcup liner. E.g. this variable may be the increase rate and decrease rate, respectively, of the pulsating vacuum, whereby the pulsating vacuum level may be detected when this rate is temporarily reduced.

By the recording means 22 the pulsating vacuum may be recorded as a function of time as the pulsating vacuum increases or decreases during a pulsation cycle. The derivative of this recorded function may be determined by the processing means 23. Since the inclination of the curve 26 is abruptly changed at the portions 27 and 29 the derivative will correspondingly change at these portions 27, 29, which may be detected by the detecting means 24.

It is also possible to record the pulsating vacuum over time by the recording means 22 as the pulsating vacuum increases or decreases during a pulsation cycle during which the interior of the teatcup liner is exposed to the atmospheric pressure. This may be done as an initial measure before the actual milking process has started and during such pulsating vacuum increase or decrease the teatcup liner 6 will be fully open. Thereafter a pulsating vacuum/time function based on the recorded pulsating vacuum may be evaluated by the processing means 23. The pulsating vacuum level during a subsequent pulsation cycle of the milking process when the increase or decrease of the pulsating vacuum deviates a predetermined value from the pulsating vacuum/time function may be detected by the detecting means 24.

Moreover it is possible to record the change of the pulsating vacuum over time by the recording means 22 as the pulsating vacuum increases or decreases during a pulsation cycle. Thereafter a pulsating vacuum/time function based on the recorded pulsating vacuum and on the prerequisite that the volume of the pulsation chamber is kept constant may be evaluated by the processing means 23. The pulsating vacuum during a subsequent pulsation cycle of the milking process may be sensed by the sensor 21, and when the sensed pulsating vacuum deviates a predetermined value from the evaluated pulsating vacuum/time function this may be detected by the detecting means 24.

Furthermore it is also possible to record the pulsating vacuum over time during the increase or decrease of the pulsating vacuum during one pulsation cycle by the recording means 22 and to have the processing means 23 to evaluate an extrapolated mathematical function by means of a few initial values of the recorded pulsating vacuum. Thereafter the detecting means 24 may detect the pulsating vacuum level when the increase or decrease of the pulsating vacuum deviates a predetermined value from the extrapolated mathematical function.

The milking machine 1 may be controlled such that the maximum pulsating vacuum level is the same in all teatcups 3 of the cluster 2. By using more than one pulsator 16 and a pressure regulating device 19 which separately regulates the vacuum level to each individual pulsator 16 the maximum pulsating vacuum level may be controlled individually in each pulsation chamber 7 in response to the sensed pulsating vacuum level in that chamber 7 when the teatcup liner 6 abruptly opens or closes, which level is sensed by an individual pressure sensor 21 for that pulsation chamber 7.

Moreover instead of controlling the pulsating vacuum it is possible to control by means of the pressure regulating device 19 only the milking vacuum or both the pulsating and milking vacuums such that the desired difference between the milking vacuum level and the maximum pulsating vacuum level is maintained.

The present invention may be applied to fully automatic milking and the type of milking machines requiring manual attachment of the teatcups and is suitable for milking of animals such as cows, sheep, goats and buffalos.

We claim:

1. A method of milking an animal by a milking machine having a teatcup with a teatcup liner and a pulsation chamber, comprising
   applying the teatcup to the teat of the animal, and
   applying a milking vacuum to the interior of the teatcup liner and a pulsating vacuum to the pulsation chamber so that the teatcup liner cyclically opens and closes, including the steps of:
   determining the pulsating vacuum level when the teatcup liner abruptly opens or closes, and
   controlling at least one of the pulsating and milking vacuums such that the maximum level of the pulsating vacuum is lower than the milking vacuum level and at least as high as said determined level.

2. A method according to claim 1, including controlling at least one of the pulsating and milking vacuums such that the maximum level of the pulsating vacuum is significantly lower than the milking vacuum level.

3. A method according to claim 1, wherein the maximum level of the pulsating vacuum is set to exceed determined level by 1–40% of the difference between the milking vacuum level and said determined level.

4. A method according to claim 1, wherein said controlling step is performed by controlling the pulsating vacuum.

5. A method according to claim 1, wherein said determining step comprises:
   sensing a variable responsive to the opening of the teatcup liner; and
   detecting the pulsating vacuum level when said sensed variable indicates said abrupt opening of the teatcup liner.

6. A method according to claim 5, wherein said determining step comprises:
   sensing the increase rate of the pulsating vacuum, and
   detecting the pulsating vacuum level when said sensed increase rate is temporarily reduced.

7. A method according to claim 5, wherein said determining step comprises:
   recording the pulsating vacuum as a function of time as the pulsating vacuum increases during a pulsation cycle,
   sensing the derivative of said function, and
   detecting the pulsating vacuum when the derivative is abruptly changed.

8. A method according to claim 5, wherein said determining step comprises:
   recording the pulsating vacuum over time as the pulsating vacuum increases during a pulsation cycle during which the interior of the teatcup liner is exposed to the atmospheric pressure,
   determining a pulsating vacuum/time function based on the recorded pulsating vacuum,
   sensing the pulsating vacuum during a subsequent pulsation cycle during which the interior of the teatcup liner is exposed to the milking vacuum, and
   detecting the pulsating vacuum level when the sensed pulsating vacuum deviates a predetermined value from said determined pulsating vacuum/time function.

9. A method according to claim 5, wherein said determining step comprises:
   recording the pulsating vacuum over time as the pulsating vacuum increases during a pulsation cycle,
   determining a theoretical pulsating vacuum/time function based on said recorded pulsating vacuum and on the prerequisite that the volume of the pulsation chamber is constant,
   sensing the pulsating vacuum during a subsequent pulsation cycle, and
   detecting the pulsating vacuum level when the sensed pulsating vacuum deviates a predetermined value from said theoretical pulsating vacuum/time function.

10. A method according to claim 5, wherein said determining step comprises:
    recording the pulsating vacuum over time during the increase of the pulsating vacuum, determining an extrapolated mathematical function by means of a few initial values of said recorded pulsating vacuum, sensing the pulsating vacuum, and detecting the pulsating vacuum level when the sensed pulsating vacuum deviates a predetermined value from said determined extrapolated function.

11. A method according to claim 1, wherein said determining step comprises:

sensing a variable responsive to the closing of the teatcup liner, and detecting the pulsating vacuum level when said sensed variable indicates said abrupt closing of the teatcup liner.

12. A method according to claim 11, wherein said determining step comprises:

sensing the decrease rate of the pulsating vacuum, and detecting the pulsating vacuum level when said sensed decrease rate is temporarily reduced.

13. A method according to claim 11, wherein said determining step comprises:

recording the pulsating vacuum as a function of time as the pulsating vacuum decreases during a pulsation cycle, sensing the derivative of said function, and detecting the pulsating vacuum level when the derivative is abruptly changed.

14. A method according to claim 11, wherein said determining step comprises:

recording the pulsating vacuum over time as the pulsating vacum decreases during a pulsation cycle during which the interior of the teatcup liner is exposed to the atmospheric pressure, determining a pulsating vacuum/time function based on said recorded pulsating vacuum, sensing the pulsating vacuum during a subsequent pulsation cycle, during which the interior of the teatcup liner is exposed to the milking vacuum, and detecting the pulsating vacuum level when the sensed pulsating vacuum deviates a predetermined value from said determined pulsating vacuum/time function.

15. A method according to claim 11, wherein said determining step comprises:

recording the pulsating vacuum over time as the pulsating vacuum decreases during a pulsation cycle, determining a theoretical pulsating vacuum/time function based on said recorded pulsating vacuum and on the prerequisite that the volume of the pulsation chamber is constant, sensing the pulsating vacuum during a subsequent pulsation cycle, and detecting the pulsating vacuum level when the sensed pulsating vacuum deviates a predetermined value from said theoretical pulsating vacuum/time function.

16. A method according to claim 11, wherein said determining step comprises:

recording the pulsating vacuum over time during the decrease of the pulsating vacuum, determining an extrapolated mathematical function by means of a few initial values of said recorded pulsating vacuum, and sensing the pulsating vacuum, and detecting the pulsating vacuum level when the sensed pulsating vacuum deviates a predetermined value from said determined extrapolated function.

17. A milking machine comprises a teatcup having a teatcup liner and a pulsation chamber, a vacuum source for generating a milking vacuum in the interior of the teatcup liner and a pulsator provided to alternately connect the pulsation chamber to the atmosphere into said vacuum source for generating a pulsating vacuum in the pulsation chamber so that teatcup liner cyclically opens and closes, including:

a sensing means for sensing the pulsating vacuum in the pulsation chamber, and an electronic processing unit adapted to control at least one of the pulsating and milking vacuums in response to said sensing means sensing the pulsating vacuum level when the teatcup liner abruptly opens or closes, such that the maximum level of the pulsating vacuum is lower than the milking vacuum level and at least as high as said sensed level.

18. A milking machine according to claim 17, wherein the electronic processing unit comprises control means adapted to control the pulsating vacuum in response to said sensing means.

19. A milking machine according to claim 18, wherein the control mean is connected to a pressure regulating device adapted to regulate the maximum pulsating vacuum level.

20. A milking machine according to claim 17 wherein that the sensing means is a pressure sensor.

21. A milking machine according to claim 17, wherein the electronic processing unit comprises:

recording means connected to the sensing means and adapted to record one of the increase and decrease rate of the pulsating vacuum, and detecting means adapted to detect the pulsating vacuum level when said rate of the pulsating vacuum is temporarily reduced.

22. A milking machine according to claim 17 wherein the electronic processing unit comprises:

recording means adapted to record the pulsating vacuum as a function of time during a pulsation cycle, processing means adapted to determine the derivative of the recorded function, and detecting means adapted to detect the pulsating vacuum level when the derivative is abruptly changed.

23. A milking machine according to claim 17, wherein the electronic processing unit comprises:

recording means adapted to record the change of the pulsating vacuum over time during a pulsation cycle during which the vacuum source is disconnected from the interior of the teatcup liner, processing means adapted to determine a pulsating vacuum/time function based on the recorded change, and detecting means adapted to detect the pulsating vacuum level during a subsequent pulsation cycle when the pulsating vacuum deviates a predetermined value from said pulsating vacuum/time function.

24. A milking machine according to claim 17, wherein the electronic processing unit comprises:

recording means adapted to record the change of the pulsating vacuum over time during a pulsation cycle, processing means adapted to determine a theoretical pulsating vacuum/time function based on the recorded change of the pulsating vacuum and on the prerequisite that the volume the pulsation chamber is kept constant, and detecting means adapted to detect the pulsating vacuum level during a subsequent pulsation cycle, when the pulsating vacuum deviates a predetermined value from said theoretical pulsating vacuum.

25. A milking machine according to claim 17, wherein the electronic processing unit comprises:

recording means adapted to record the pulsating vacuum during one of the increase and decrease of the pulsating vacuum during a pulsation cycle, processing means adapted to determine an extrapolated mathematical function by means of a plurality of values of a beginning phase of said recorded pulsating vacuum, and detecting means adapted to detect the pulsating vacuum level when the pulsating vacuum deviates a predetermined value from said extrapolated mathematical function.

* * * * *